(12) United States Patent
Lahr et al.

(10) Patent No.: US 11,088,607 B2
(45) Date of Patent: Aug. 10, 2021

(54) AXIAL FLUX MACHINE WITH NUTATING ROTOR

(71) Applicant: GM Global Technology Operations LLC, Detroit, MI (US)

(72) Inventors: Derek F. Lahr, Howell, MI (US); Alireza Fatemi, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 16/396,068

(22) Filed: Apr. 26, 2019

(65) Prior Publication Data
US 2020/0343803 A1  Oct. 29, 2020

(51) Int. Cl.
*H02K 7/116* (2006.01)
*H02K 41/06* (2006.01)
*H02K 7/00* (2006.01)
*H02K 1/27* (2006.01)

(52) U.S. Cl.
CPC .......... *H02K 41/065* (2013.01); *H02K 1/272* (2013.01); *H02K 7/003* (2013.01); *H02K 7/116* (2013.01)

(58) Field of Classification Search
CPC ...... H02K 1/272; H02K 41/065; H02K 7/003; H02K 7/116
See application file for complete search history.

(56) References Cited

U.S. PATENT DOCUMENTS

| 3,341,725 A * | 9/1967 | Gifford ................ H02K 41/065 310/80 |
| 4,914,330 A | 4/1990 | Pierrat |
| 5,309,041 A * | 5/1994 | Kawai .................. H02K 41/065 310/49.48 |
| 5,448,117 A | 9/1995 | Elliott |
| 5,804,898 A * | 9/1998 | Kawai .................. H02K 41/065 310/268 |
| 9,669,701 B2 | 6/2017 | Bolt |
| 9,890,832 B2 | 2/2018 | Kurth et al. |
| 10,023,406 B2 | 7/2018 | Klubertanz et al. |
| 10,090,747 B2 | 10/2018 | Hofmeister |

* cited by examiner

Primary Examiner — Dang D Le
(74) Attorney, Agent, or Firm — Quinn IP Law

(57) ABSTRACT

An axial flux-type rotary electric machine includes a rotor having a rotor axis and a stator having a stator axis. The stator is positioned adjacent to the rotor such that an axial airgap is defined between the rotor and the stator. First and second non-parallel rotor shafts are respectively collinear with the stator axis and the rotor axis. A nutating gear pair is connected to a stationary member and the rotor, and is configured to impart nutating motion to the rotor with respect to the stator, such that a size of the axial airgap changes with a rotational position of the rotor, and such that the rotor has two degrees of freedom of motion. An electrical system includes direct and alternating current voltage buses, a power inverter module connected to the voltage buses, and the axial flux-type rotary electric machine connected to the alternating current voltage bus.

17 Claims, 4 Drawing Sheets

AXIAL FLUX MACHINE WITH NUTATING ROTOR

INTRODUCTION

Rotary electric machines transform electrical energy into mechanical energy via the interaction of magnetic fields. Electric motors and generators, for instance, include a rotating member ("rotor") and a stationary member ("stator"). Unlike radial flux machines having a concentric stator-rotor arrangement in which magnetic flux is directed across a radial stator-rotor airgap to produce rotational forces, magnetic flux in an axial flux machine is produced and directed in a direction that is parallel to the rotor's axis of rotation. The rotor of an axial flux machine is therefore disposed adjacent to the stator such that the stator-rotor airgap extends in the axial direction.

Concentrated stator windings of an axial flux-type rotary electric machine produce a higher power-to-weight ratio relative to distributed windings of the type typically used in a radial flux machine. For an alternating current machine configuration, a polyphase input voltage is sequentially applied to the phase leads of such stator windings to generate a rotating stator magnetic field. Rotation of the ferrous rotor is produced in a manner that depends upon the particular construction of the electric machine, e.g., using forces produced by magnetic reluctance or by an opposing rotor magnetic field. An axial flux machine configuration may therefore enable higher flux densities and a corresponding decrease in moment of inertia and rotor mass relative to radial flux machines.

SUMMARY

Disclosed herein are structural improvements and adaptations of an axial flux-type rotary electric machine. An embodiment of the electric machine includes a stator, a rotor, non-parallel first and second rotor shafts, and a nutating gear pair. The nutating gear pair, which may be a separate gear set or integrally formed with the stator and rotor structure in different configurations, provides the rotor with nutating motion with respect to the stator. Two degrees of freedom (2DOF) of motion of the rotor are enabled by the nutating gear pair and the non-parallel rotor shafts, i.e., rotation/rolling motion of the rotor about a respective axis of the first and second rotor shafts.

As will be appreciated by those of ordinary skill in the art, the provided nutating motion of the rotor entails a combined rotational rocking motion of the rotor progressively toward and away from a given point on the stator's circumferential face as the rotor rotates through a full 360°. The nutating motion in turn progressively decreases or increases the width of the axial stator-rotor airgap, with the airgap width at a given point on the stator's face varying with the present nutating position of the rotor.

In applications in which 1DOF is preferable at an output member of the rotary electric machine, such as when the electric machine is used as part of a stationary or mobile powertrain, the above-described 2DOF enabled by the nutating gear pair may be reduced to 1DOF using a downstream coupling mechanism, e.g., a constant velocity (CV) joint, such that the output member of the electric machine is able to rotate about its axis with no other motion. 1DOF rotation of the output member may be mechanically harnessed and directed to a coupled load as needed to perform useful work, e.g., via gear sets and/or pulleys.

In terms of the forces that are ultimately generated in the axial stator-rotor airgap, for a typical axial flux-type rotary electric machine the electromagnetic torque that is present in the airgap has both tangential and axial force components. The axial airgap forces, which are several times larger than the tangential forces, do not contribute to the output torque of the electric machine. The nutating machine described in detail below are therefore intended to incorporate otherwise unused axial airgap forces into the output torque in order to realize certain performance advantages, including the production of higher levels of motor output torque at lower motor speeds with a rotor having reduced size.

An embodiment of the axial flux-type rotary electric machine includes a rotor, stator, first and second rotor shafts, a stationary member, and a nutating gear pair. The rotor has a rotor axis. The stator has a stator axis and is positioned adjacent to the rotor, such that an axial airgap is defined between the rotor and the stator. The first and second rotor shafts are collinear with the stator axis and the rotor axis, respectively, and are non-parallel with respect to each other. A nutating gear pair is connected to the stationary member and the rotor, and is configured, in conjunction with the first and second rotor shafts, to impart a nutating motion to the rotor with respect to the stator when the stator is energized. A size of the axial airgap thus changes in conjunction with a rotational position of the rotor, and allows the rotor to move with two degrees of freedom of motion.

A joint assembly may be connected to the second rotor shaft. Such a joint assembly may be used to translate the two degrees of freedom of motion to a single degree of freedom of motion. The joint assembly may be connected to an output member of the electric machine. The output member may be coupled to a driven load.

The joint assembly in some embodiments is a constant-velocity joint. The axial flux machine may deliver output torque to a powertrain component via an output member. The driven load in such an embodiment may include the powertrain component. The powertrain component may include road wheels as the driven load.

The machine may include an additional rotor adjacent to the stator, and may also include an additional nutating gear pair and an additional rotor shaft. The additional nutating gear pair may be connected to the stationary member and the additional rotor. The rotors flank the stator in this non-limiting embodiment, and the additional rotor shaft is non-parallel with respect to the second rotor shaft.

The stator may be electrically connectable to a polyphase voltage supply. In such an embodiment, the machine may be configured as a magnetic reluctance machine.

An electrical system is also disclosed herein. The electrical system in a possible embodiment includes a power inverter module connected to a DC voltage bus and to an AC voltage bus. The electrical system also includes an axial flux machine configured as set forth above, i.e., having a stator positioned adjacent to a rotor such that an axial airgap is defined between the rotor and the stator, and having the first and second rotor shafts and the nutating gear pair.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
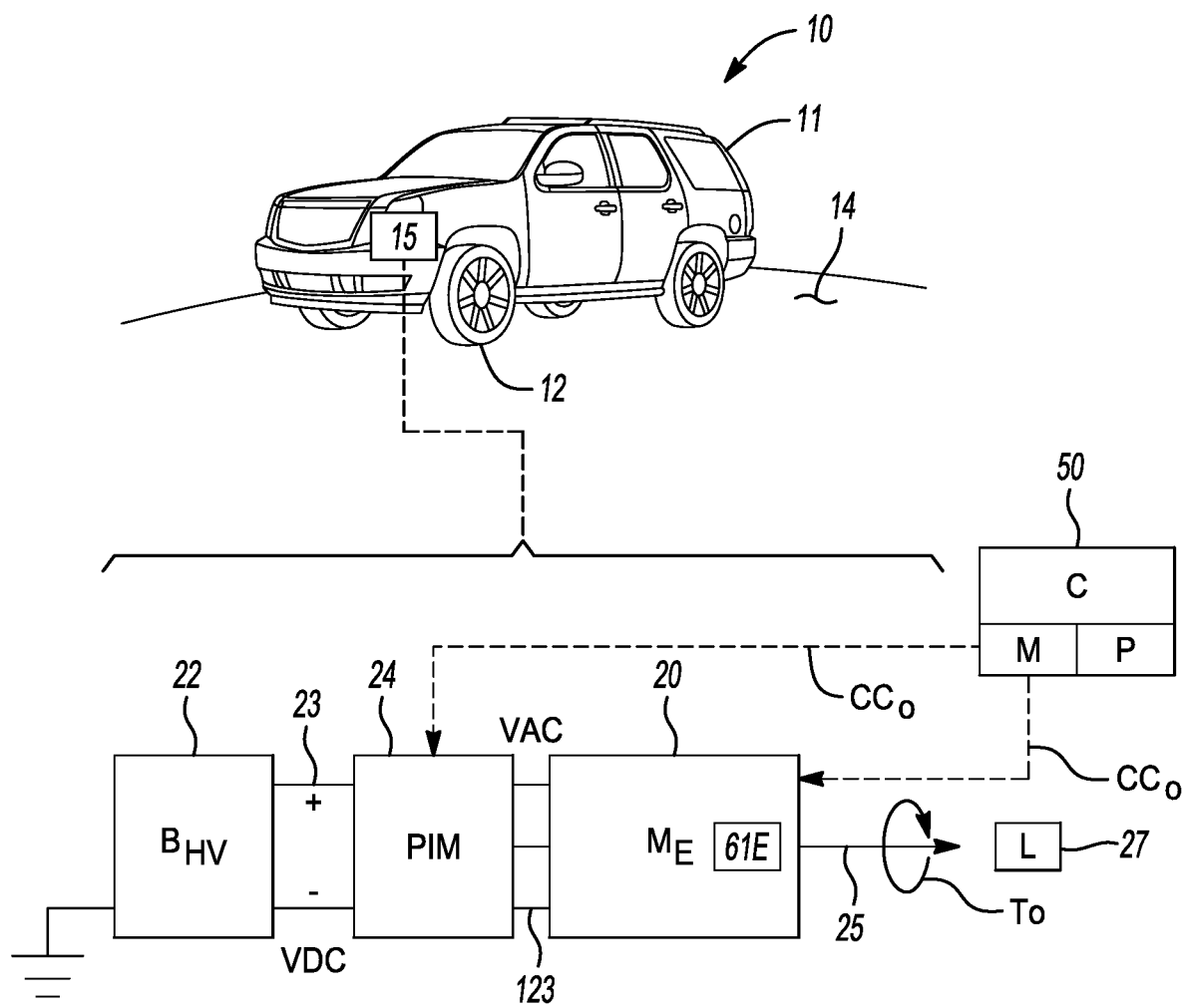
FIG. 1 is a schematic illustration of an example vehicular electrical system having a nutating rotary electric machine configured according to the present disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, an electrical system 15 is shown schematically in FIG. 1. The electrical system 15 may be used in various electromechanical systems, including as part of a drivetrain, e.g., of a motor vehicle 10 having a body 11 and road wheels 12 in rolling contact with a road surface 14. The electrical system 15 may be used in other types of vehicles such as aircraft, watercraft, and rail vehicles, or in other mobile non-vehicular applications such as robots and mobile platforms. Stationary applications may likewise benefit from use of the electrical system 15, and therefore the motor vehicle 10 of FIG. 1 is just one possible beneficial application of the present teachings.

The electrical system 15 includes an axial flux-type rotary electric machine ($M_E$) 20, which is hereinafter referred to as an axial flux machine 20 for simplicity. The axial flux machine 20, which is configured to act with nutating motion as set forth below, delivers output torque (arrow $T_O$) via an output member 25. The output member 25 and the output torque (arrow $T_O$) transmitted thereby may be used to rotate a connected drivetrain or powertrain component or another driven load (L) 27. In a non-limiting motor vehicle 10, for instance, the road wheels 12 may function as part of the driven load 27.

The rotary electric machine 20 may be embodied as a magnetic reluctance machine in certain embodiments, such that a ferrous rotor 30 (see FIG. 2) of the rotary electric machine 20 is characterized by an absence of permanent magnets, and instead relies on forces imparted by magnetic reluctance of the rotor 30. The construction of the electric machine 20 ultimately enables the two degrees of freedom (2DOF) of motion set forth below with reference to FIGS. 2-4.

As will be understood by those of ordinary skill in the art, reluctance machines, e.g., synchronous, switched, or variable reluctance machines, are characterized by an absence of permanent magnets on a machine rotor, instead inducing non-permanent rotor magnetic poles. The output torque (arrow $T_O$) generated by such machines is ultimately generated as a result of forces due to the principles of magnetic reluctance. The rotary electric machine 20 is operable for providing motion with the above-described 2DOF, i.e., rotary motion about non-parallel axes $A_1$ and $A_2$ as shown in FIG. 2, with the disclosed nutating motion serving to maximize torque per volume of the example rotary electric machine 20.

In the illustrated example embodiment of FIG. 1, the electrical system 15 includes a battery ($B_{HV}$) 22 and a power inverter module (PIM) 24. The battery 22 may optionally have a relatively high voltage capacity, e.g., 60-volts or more depending on the embodiment, and thus "high-voltage" is indicated by subscript "HV". The rotary electric machine 20 may be embodied as a polyphase electric motor, for instance, and thus may be electrically connected to an AC bus 123, with the rotary electric machine 20 energized by an AC voltage (VAC) from the PIM 24. The PIM 24 in turn is connected to the battery 22 via positive (+) and negative (−) rails of a DC voltage bus 23, with a DC voltage (VDC) supplied by the DC voltage bus 23 to the PIM 24 and vice versa depending on whether the rotary electric machine 20 functions in its capacity as a motor or as a generator.

Operation of the electrical system 15 may be regulated in real-time by a controller (C) 50 via control signals (arrow $CC_O$), which may be transmitted to the various controlled components in the electrical system 15 wirelessly and/or over low-voltage transfer conductors. The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Figure 2:
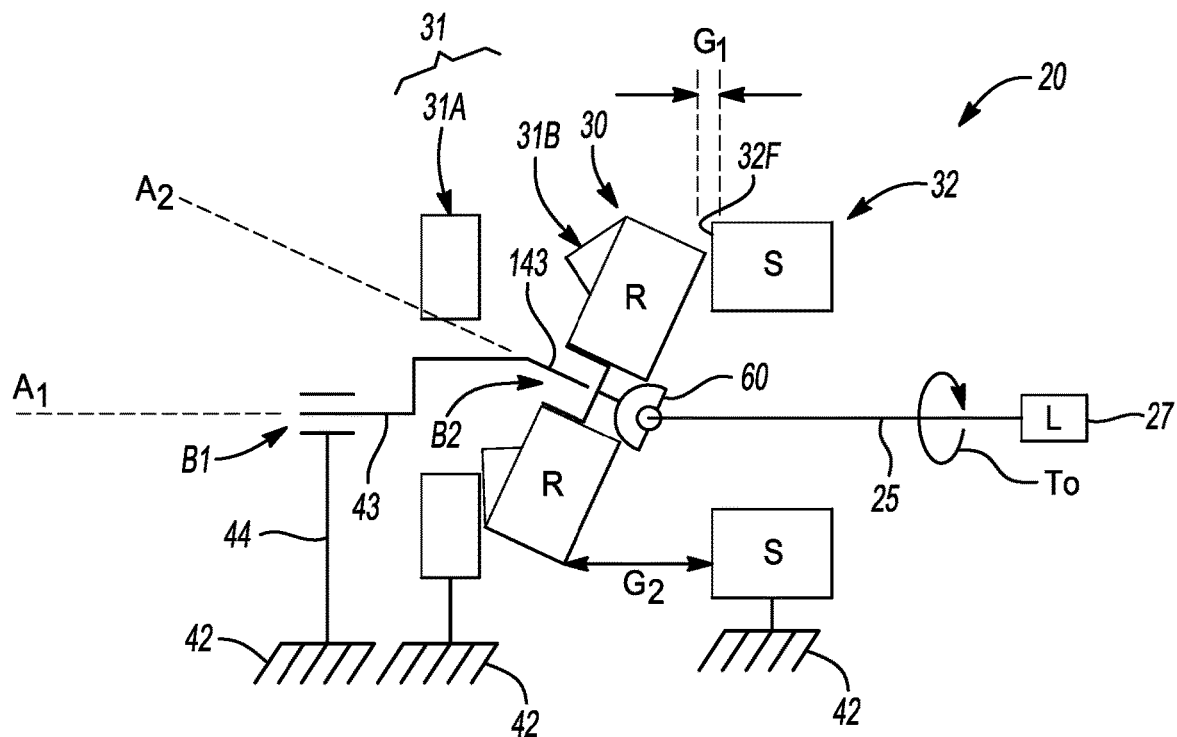
FIG. 2 is a schematic cross-sectional side view illustration of a nutating rotary electric machine that may be used in the example electrical system shown in FIG. 1.

FIG. 2 schematically depicts a cross-sectional view of the rotary electric machine 20 of FIG. 1. A rotor (R) 30 is positioned axially-adjacent to a stator (S) 32, the latter of which is securely and non-rotatably connected to a stationary member 42 as shown. For instance, the stationary member 42 may be embodied as a housing in which the rotor 30, the stator 32, and other depicted components are disposed and structurally supported. The stator 32 may be separated from the rotor 30 by an axial airgap that, depending on the nutating position of the rotor 30 with respect to a particular point on a circumferential face 32F of the stator 32, is either closer to or farther away from the stator 32 as respectively represented by airgaps $G_1$ and $G_2$.

The rotor 30 of the rotary electric machine 20 is constrained to move in a nutating manner with respect to the circumferential face 32F of the stator 30, with an illustrative example of desirable nutating motion described below with reference to FIGS. 3A-C. To achieve such nutating motion, the rotary electric machine 20 is equipped with a skewed/non-parallel pair of rotor shafts 43 and 143 with respective axes $A_1$ and $A_2$. The degree to which the axes $A_1$ and $A_2$ are oriented with respect to each other is exaggerated in FIG. 2 for illustrative clarity, with the axes $A_1$ and $A_2$ possibly being arranged as little as a few degrees apart, or further apart depending on the embodiment.

Axes $A_1$ and $A_2$ are collinear with the stator 32 and the rotor 30, respectively. In addition to the non-parallel axis $A_1$ and $A_2$, a nutating gear pair 31, i.e., first and second gears 31A and 31B, constrains motion of the rotor 30 to 2DOF, i.e., rotation about each of the axes $A_1$ and $A_2$. That is, the nutating gear pair 31 is connected to stationary member 42 and the rotor 30, and is configured to impart nutating motion to the rotor 30 with respect to the stator 32 such that the axial stator-rotor airgap changes in conjunction with the rotational position of the rotor 30, and such that the rotor 30 is constrained to the above-noted 2DOF of motion. Bearings B1 and B2 may be used to help support the rotor shafts 43 and 143 and enable relative motion thereof, with a support shaft 44 possibly extending between the stationary member 42 and the bearing B1 to help absorb some of the load imparted by the inertial and magnetic forces occurring in the rotary electric machine 20.

The above-described 2DOF of motion of the rotor 30 may be optionally translated into 1DOF as described below, such that the output member 25 rotates and thereby delivers the output torque (arrow $T_O$) to the coupled load (L) 27. For instance, a joint assembly 60 such as a continuous velocity (CV) joint or other suitable joint may be used to translate the 2DOF motion of the rotor 30 into 1DOF motion. Such a joint assembly 60 may be connected to the output member 25 of the rotary electric machine 20, as shown in FIG. 2, with output member 25 in turn coupled to the driven load 27. As used herein, the term "1DOF" describes rotation of output member 25 about its own axis. When the driven load 27 includes the above-noted drive axle or drive wheels 12 of the representative motor vehicle 10 shown in FIG. 1, for instance, motion with 1DOF may be used to power the drive wheels 12 and thereby propel the vehicle 10, or to recharge the battery 22 of FIG. 1 when the rotary electric machine 20 operates in a regenerating mode.

The structure of the nutating gear pair 31 noted above may be in the form of the first and second gear elements 31A and 3B, with the nutating gear pair 31 being connected to the rotor 30 and the stationary member 42 as shown. Alternatively, the first and second gear elements 31A and 31B may be connected to or integrated into the facing structure of the rotor 30 and stator 32, e.g., as surface profiles, as will be appreciated, such that the resulting motion of the rotor 30 is nutating motion with respect to the stator 32. From the standpoint of operation of the rotary electric machine 20, either approach provides the desired nutating motion, and thus either configuration may be used within the scope of the disclosure.

Figure 3A:
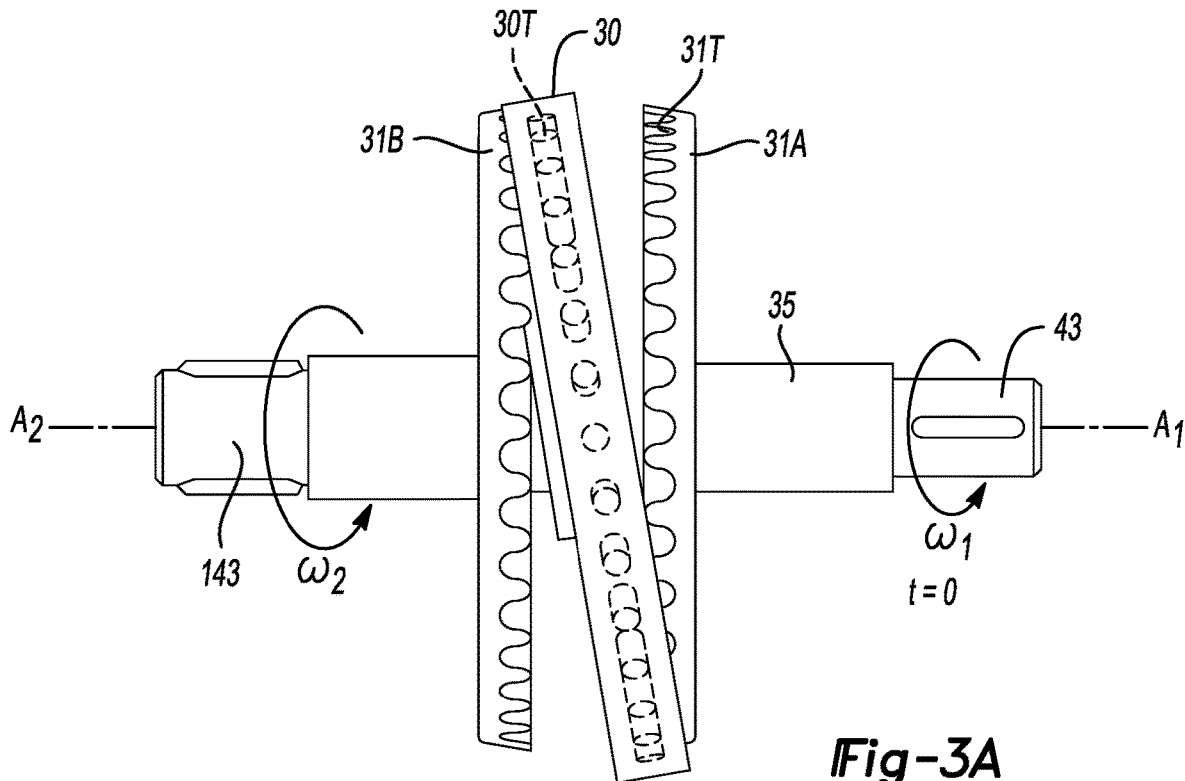
FIGS. 3A-C are schematic side perspective view illustrations of nutating motion of a gear set usable as part of the rotary electric machine of FIG. 2.
Figure 3B:
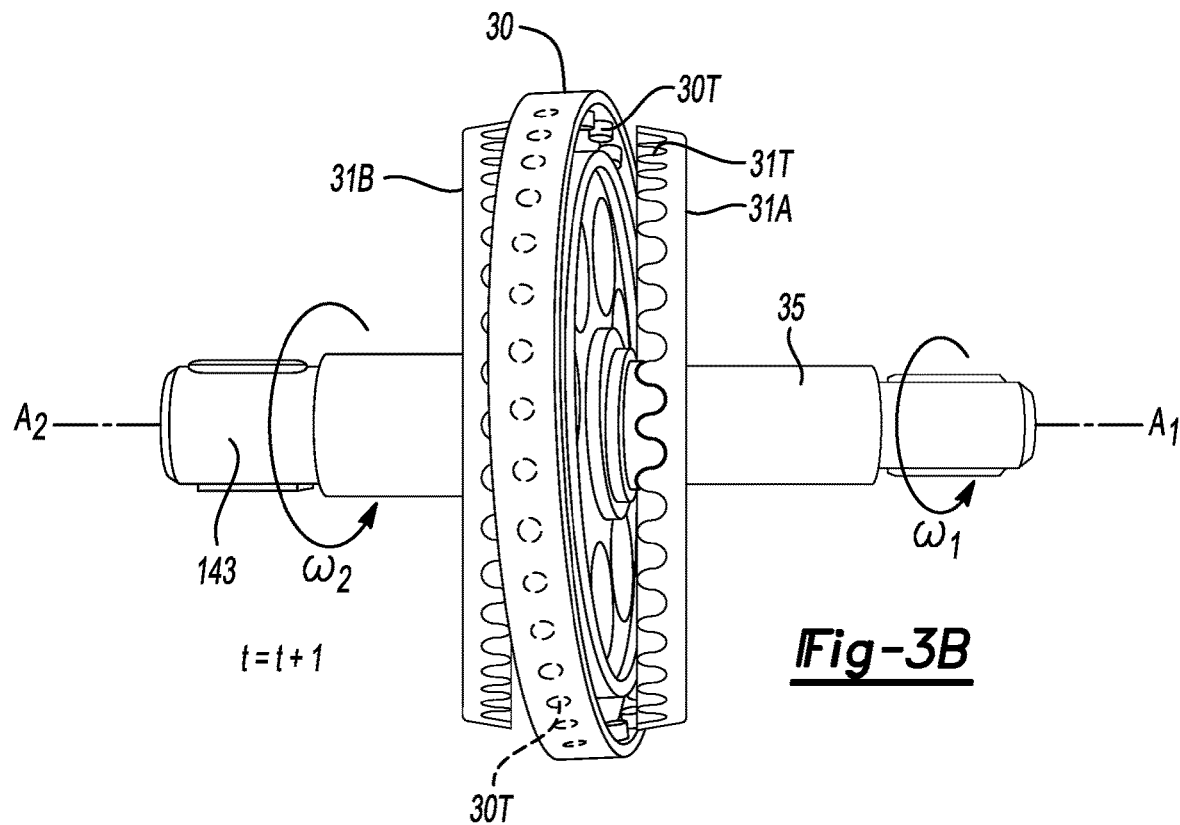
Figure 3C:
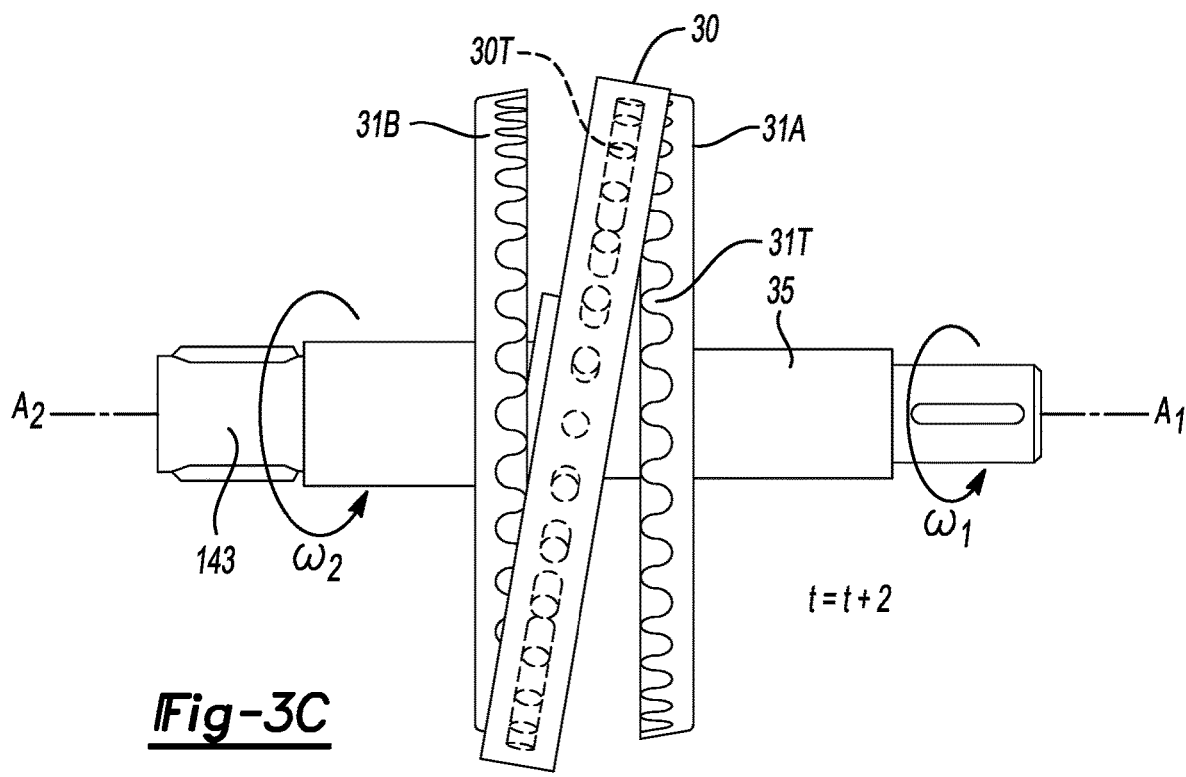

Referring briefly to FIG. 3-C, 2DOF motion according to the present disclosure is represented schematically via a sequence of motion of the rotor 30, shown schematically as a simplified gear element, commencing at time t=0 (FIG. 3A) and continuing until future points time t=t+1 (FIG. 3B) and t=t+2 (FIG. 3C). In a nutating type of motion, as the rotor 30 rotates about axis $A_2$, the top of the rotor 30 from the perspective of FIG. 3A will begin rotate about a radial axis $A_3$ starting from the position shown in FIG. 3A, doing so in a clockwise manner with rotation of the rotor shafts 43 and 143 as indicated by arrow N1. At the same time, a bottom of the rotor 30 of FIG. 3A will begin to rotate toward the second gear element 31B, as shown progressively in FIGS. 3B and 3C. All the while, the rotor 30 continues to rotate about axis $A_2$. FIG. 3C thus shows the relative positions of the rotor 30 and stator 32 after 180° of rotation from the point depicted in FIG. 3A.

To achieve the desired nutating motion, and thus the back-and-forth wobbling of the rotor 30, the first gear element 31A may be held stationary on a shaft sleeve 35, within which resides the rotor shaft 43 with axis $A_1$. As will be appreciated, in a nutating gear arrangement such as is provided by the nutating gear pair 31, the first and second gear elements 31A and 31B may each include axially-projecting gear teeth 31T orientated toward each other. In addition to the non-parallel axes $A_1$ and $A_2$, the number of the gear teeth 31T may be different on the first gear element 31A relative to the second gear element 31B to further cause the rotor 30 to nutate in the desired manner.

The rotor 30 may include radial pins or pegs 30T that rotate into and out of engagement between the gear teeth 31T of the first and second gear elements 31A and 31B, such that the second gear element 31B rotates at a speed ($\omega_2$) that is less than a speed ($\omega_1$) of the rotor shaft 43. The closer to parallel that the rotor shafts 43 and 143 are arranged, the higher the effective ratio (gear ratio) of the nutating gear pair 31. Other integrated or separate embodiments of the nutating gear pair 31 providing the illustrated nutating motion may be envisioned, and therefore the depicted embodiment of FIGS. 3A-C is intended to be representative of the desired motion used in the present teachings.

Figure 4:
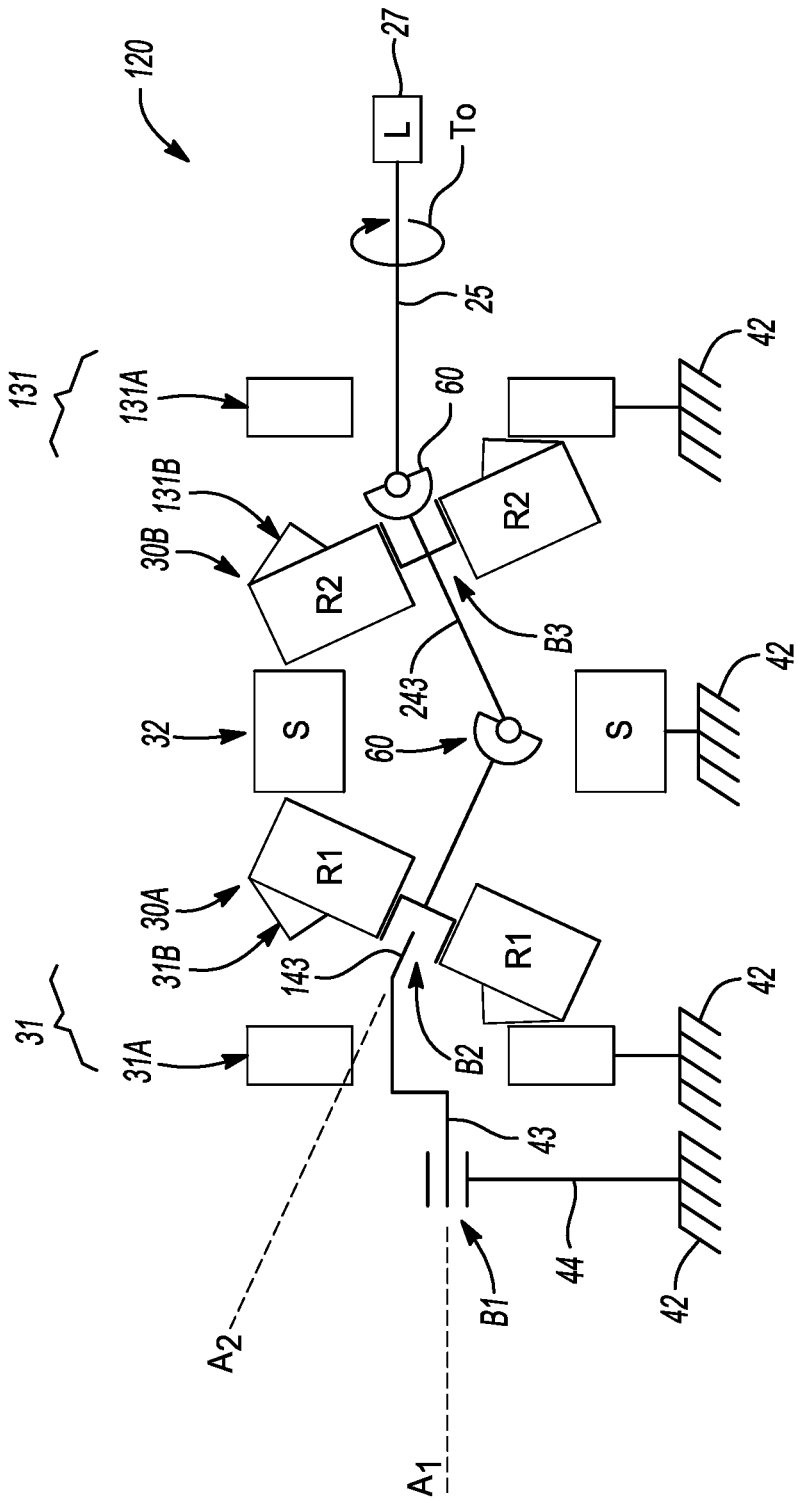
FIG. 4 is a schematic cross-sectional side view illustration of an alternative dual-rotor construction of the nutating rotary electric machine shown in FIG. 2.

Referring to FIG. 4, the nutating motion shown in FIGS. 3A-C may be realized in an alternative rotary electric machine 120 having multiple rotors (R1, R2) 30A and 30B, which may be improve overall balancing of the rotary electric machine 120. The example embodiment of FIG. 4 provides the rotor 30B as a second rotor adjacent to the stator (S) 32, along with additional nutating gear pair 131 and an additional rotor shaft 243 that is non-parallel with respect to rotor shaft 143. The additional nutating gear pair 131 is connected to the additional rotor 30B and the stationary member 42.

In the illustrated embodiment, the rotors 30A and 30B flank the stator 32. Inertial and magnetic forces generated during operation of the rotary electric machine 120 are largely cancelled out relative to the example single-rotor configuration of FIG. 2 in which such forces are largely born by the bearings B1 and B2 and support shaft 44. An additional joint assembly 60, such as the above-noted example CV joint, may be used downstream of the additional/second rotor 30B to translate 2DOF motion to the desired 1DOF for driving the load 27. Other embodiments not pictured herein may be used within the scope of the disclosure, including a single rotor 30 positioned between a pair of stators 32 such that the rotor 30 is flanked by the stators 32.

The present disclosure therefore enables construction of an axial flux-type rotary electric machine 20 or 120 having one or more rotors 30 and one or more stators 32, with the rotor(s) 30 constrained in such a way as to move with the nutating motion exemplified in FIGS. 3A-C. Such motion may be useful in certain applications by allowing axial forces present in the stator-rotor airgap to generate torque on the rotor(s) 30. Relative to radial flux machines, application of the present teachings to axial flux machines may be more easily balanced, e.g., using the configuration of FIG. 4. These and other possible benefits will be appreciated by one of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An axial flux-type rotary electric machine comprising:
a rotor having a rotor axis;

a stator having a stator axis, wherein the stator is positioned adjacent to the rotor such that an axial airgap is defined between the rotor and the stator;

first and second rotor shafts that are collinear with the stator axis and the rotor axis, respectively, wherein the first and second rotor shafts are non-parallel with respect to each other;

a stationary member; and a nutating gear pair connected to the stationary member and to the rotor, and configured, in conjunction with the first and second rotor shafts, to impart a nutating motion to the rotor with respect to the stator when the stator is energized, such that a size of the axial airgap changes in conjunction with a rotational position of the rotor, and such that the rotor has two degrees of freedom of motion.

2. The rotary electric machine of claim 1, further comprising:

a joint assembly connected to the rotor, wherein the joint assembly is configured to translate the two degrees of freedom of motion into a single degree of freedom of motion.

3. The rotary electric machine of claim 2, wherein the rotary electric machine includes an output member coupled to a driven load, and wherein the joint assembly is connected to the output member.

4. The rotary electric machine of claim 3, wherein the joint assembly is a constant-velocity joint.

5. The rotary electric machine of claim 4, wherein the rotary electric machine includes an output member coupled to a powertrain component, and wherein the driven load includes the powertrain component.

6. The rotary electric machine of claim 5, wherein the powertrain component includes a set of drive wheels of a motor vehicle.

7. The rotary electric machine of claim 1, further comprising:

an additional rotor positioned adjacent to the stator, an additional nutating gear pair, and an additional rotor shaft, wherein the additional nutating gear pair is connected to the additional rotor and to the stationary member, the rotor and the additional rotor flank the stator, and the additional rotor shaft is non-parallel with respect to the second rotor shaft.

8. The rotary electric machine of claim 1, wherein the stator is electrically connectable to a polyphase voltage supply.

9. The rotary electric machine of claim 8, wherein the rotary electric machine is a polyphase magnetic reluctance machine.

10. An electrical system comprising:

a direct current (DC) voltage bus;

an alternating current (AC) voltage bus;

a power inverter module (PIM) connected to the DC voltage bus and to the AC voltage bus; and an axial flux-type rotary electric machine comprising:

a stationary member;

a rotor having a rotor axis;

a stator having a stator axis, wherein the stator is positioned adjacent to the rotor such that an axial airgap is defined between the rotor and the stator;

first and second rotor shafts that are non-parallel with respect to each other, and that are collinear with the stator axis and the rotor axis, respectively; and a nutating gear pair connected to the stationary member and to the rotor, and configured, in conjunction with the first and second rotor shafts, to impart a nutating motion to the rotor with respect to the stator when the stator is energized, such that a size of the axial airgap changes in conjunction with a rotational position of the rotor, and such that the rotor has two degrees of freedom of motion.

11. The electrical system of claim 10, further comprising:

a joint assembly connected to the second rotor shaft, wherein the joint assembly is configured to translate the two degrees of freedom of motion into a single degree of freedom of motion.

12. The electrical system of claim 11, wherein the axial flux-type rotary electric machine includes an output member, the joint assembly is connected to the output member, and the output member is coupled to a driven load.

13. The electrical system of claim 12, wherein the driven load is a powertrain component.

14. The electrical system of claim 13, wherein the powertrain component includes a set of drive wheels of a motor vehicle.

15. The electrical system of claim 11, wherein the joint assembly is a constant-velocity joint.

16. The electrical system of claim 10, further comprising:

an additional rotor adjacent to the stator;

an additional nutating gear pair; and an additional rotor shaft, wherein the additional nutating gear pair is connected to the additional rotor and the stationary member, the rotor and the additional rotor flank the stator, and the additional rotor shaft is non-parallel with respect to the second rotor shaft.

17. The electrical system of claim 10, wherein the axial flux-type rotary electric machine is a magnetic reluctance machine.

* * * * *